(12) United States Patent
Yamamoto

(10) Patent No.: US 7,513,331 B2
(45) Date of Patent: Apr. 7, 2009

(54) ELECTRIC POWER STEERING DEVICE AND ATTACHMENT STRUCTURE FOR MOTOR AND CONTROLLER FOR THE SAME

(75) Inventor: Takeshi Yamamoto, Gunma (JP)

(73) Assignee: NSK Ltd., Tokyo (JP)

( * ) Notice: Subject to any disclaimer, the term of this patent is extended or adjusted under 35 U.S.C. 154(b) by 217 days.

(21) Appl. No.: 11/529,500

(22) Filed: Sep. 29, 2006

(65) Prior Publication Data

US 2007/0095602 A1    May 3, 2007

(30) Foreign Application Priority Data

Sep. 30, 2005    (JP) .................... 2005-289110

(51) Int. Cl.
B62D 5/04    (2006.01)
(52) U.S. Cl. ..................... 180/444; 180/446
(58) Field of Classification Search ............. 180/444, 180/446
See application file for complete search history.

(56) References Cited

U.S. PATENT DOCUMENTS

| | | | | |
|---|---|---|---|---|
| 2,021,706 | A * | 11/1935 | Wickliffe | 180/443 |
| 2,248,251 | A * | 7/1941 | Reeves | 180/444 |
| 5,503,241 | A * | 4/1996 | Hiraiwa | 180/446 |
| 5,732,790 | A * | 3/1998 | Endo et al. | 180/444 |
| 6,695,091 | B2 * | 2/2004 | Achenbach et al. | 180/444 |
| 6,864,605 | B2 * | 3/2005 | Shimizu et al. | 310/68 R |
| 6,889,794 | B2 * | 5/2005 | Higashira et al. | 180/444 |
| 6,906,483 | B2 * | 6/2005 | Tominaga et al. | 318/293 |
| 6,989,616 | B2 * | 1/2006 | Okubo et al. | 310/64 |
| 7,021,418 | B2 * | 4/2006 | Tominaga et al. | 180/444 |
| 7,290,638 | B2 * | 11/2007 | Shiino et al. | 180/444 |
| 7,445,081 | B2 * | 11/2008 | Tominaga | 180/444 |
| 7,448,466 | B2 * | 11/2008 | Miller et al. | 180/444 |
| 2005/0167183 | A1 | 8/2005 | Tominaga et al. | |
| 2007/0045037 | A1 * | 3/2007 | Yoshinari et al. | 180/444 |
| 2007/0235247 | A1 * | 10/2007 | Hirakawa et al. | 180/444 |

FOREIGN PATENT DOCUMENTS

| | | |
|---|---|---|
| EP | 1769999 A1 * | 4/2007 |
| JP | 2003-118602 A | 4/2003 |
| JP | 2005-212722 A | 8/2005 |
| WO | WO 2007043283 A1 * | 4/2007 |

OTHER PUBLICATIONS

Patent Abstracts of Japan, JP 2005-212722, Aug. 11, 2005.

* cited by examiner

Primary Examiner—Paul N Dickson
Assistant Examiner—Patrick Centolanzi
(74) Attorney, Agent, or Firm—Sughrue Mion, PLLC

(57) ABSTRACT

An electric power steering device includes a motor 12 for giving a steering assist force to a steering system and a controller 15 for controlling a turning on state of the motor 12 in accordance with a steering torque of the steering system. The motor 12 and the controller 15 are respectively formed with separate units. Further, the motor 12 has a flange part 13 attached to an attaching member of a steering mechanism. The flange part 13 further includes a flange extension part 14 formed by projecting a part of the flange part in a direction of circumference. The controller 15 is attached to the flange extension part 14 to be mounted on an output shaft side B of the motor 12.

2 Claims, 5 Drawing Sheets

ELECTRIC POWER STEERING DEVICE AND ATTACHMENT STRUCTURE FOR MOTOR AND CONTROLLER FOR THE SAME

TECHNICAL FIELD

The present invention relates to an electric power steering device for generating an assist torque depending on a steering torque of a steering system, and more particularly to an attachment structure for a motor and a controller thereof.

BACKGROUND ART

As the electric power steering device of this type, techniques disclosed in, for instance, Japanese Patent Unexamined Publication JP-A-2003-118602 and JP-A-2005-212722 have been known.

In the technique disclosed in the JP-A-2003-118602, a motor and a controller are arranged in parallel. Further, the motor and the controller are attached to stand upright on a steering column so that they are directed upward a vehicle substantially at right angles to the axis of the steering column. Thus, when the steering column is mounted on the vehicle, the balance of the weight of the steering column in right and left parts can be obtained, so that attaching characteristic to the vehicle can be improved.

Further, in the technique disclosed in the JP-A-2005-212722, a motor and a controller are adjacently arranged (see FIGS. 2 and 3 in the JP-A-2005-212722). Thus, a long harness is not required so that a cost is reduced and an electromagnetic wave noise is preferably met.

However, as in the techniques disclosed in, for instance, the Patent Documents 1 and 2, when the motor and the controller are simply adjacently arranged, for instance, in the case of the electric power steering device of a column type, a motor 120 is frequently laid out to be inclined relative to a vehicle as shown in FIG. 6. Thus, an amount of protrusion T2 of a controller 150 is undesirably increased. When the motor and the controller are simply adjacently arranged in such a way, a layout to the vehicle may be possibly greatly restricted. Accordingly, there is still room for an improvement in providing the electric power steering device requiring a compact layout.

SUMMARY OF THE INVENTION

Thus, the present invention is devised by noticing the above-described problems and it is an object to provide an electric power steering device that realizes a compact form by effectively using a dead space and an attachment structure for a motor and a controller for the electric power steering device.

In order to solve the above-described problems, the present invention provides an attachment structure for a motor used for an electric power steering device and a controller for controlling a turning on state of the motor. The motor and the controller are respectively formed with separate units. The motor has a flange part attached to an attaching member of a steering mechanism. The flange part further includes a flange extension part extended from a part of the flange part in the radial direction. The controller is attached to the flange extension part so as to be mounted on the output shaft side of the motor.

Further, the present invention provides an electric power steering device including a motor that applies a steering assist force to a steering system and a controller for controlling a turning on state of the motor in accordance with a steering torque of the steering system. The motor and the controller are respectively formed with separate units. The motor has a flange part attached to an attaching member of a steering mechanism. The flange part further includes a flange extension part extended from a part of the flange part in the radial direction. The controller is attached to the flange extension part and mounted on the output shaft side of the motor.

According to the present invention, the flange extension part is extended from a part of the flange part of the motor in the radial direction and the controller is attached to the flange extension part and mounted on the output shaft side of the motor. Accordingly, for instance, in the electric power steering device of the column type, when the motor is laid out to be inclined relative to the vehicle, the controller can be laid out so as to be located in an area serving as the dead space like a space (an area designated by a sign S shown in FIG. 6) provided in the side part of a gear box. Thus, the electric power steering device can be made to be compact.

Here, the motor and the controller are preferably attached by detachable fixing units respectively and the attaching and detaching direction of the fixing unit of the controller is desirably the same as the attaching and detaching direction of the fixing unit of the motor. According to such a structure, the motor and the controller can be easily attached to and detached from the same direction. For instance, in an assembly step in a production line, the motor and the controller can be assembled or attached in the same step. Accordingly, the assembly or attaching characteristics of the electric power steering device itself can be improved. As the fixing units of the motor and the controller, for instance, fastening units by bolts and tapped holes can be used.

Further, the motor and the controller are connected to each other by a detachable electric connecting unit and the attaching and detaching direction of the electric connecting unit is preferably made to be the same as the attaching and detaching direction of the fixing unit of the controller. According to such a structure, when the controller is attached or detached, since the attaching and detaching direction of the fixing unit of the controller itself is the same as that of the electric connecting unit, the attaching characteristics can be improved.

As the electric connecting unit for connecting the motor to the controller to each other, for instance, a power line of the motor may be used as a harness, and the terminal of the harness may be connected to the output terminal of the controller side to each other by a bolt and a nut through a washer. Further, the power line of the motor may be used as a bus bar and the power line of the controller side may be also used as a bus bar and the bus bars may be fastened together by a bolt and a nut. In these cases, the direction for attaching and detaching the electric connecting unit means the attaching and detaching side of the connector in the direction for inserting and pulling out the connector.

According to the present invention, an electric power steering device that realizes a compact form by effectively using a dead space and an attachment structure for a motor and a controller for the electric power steering device can be provided.

DETAILED DESCRIPTION OF THE PREFERRED EMBODIMENTS

Figure 1:
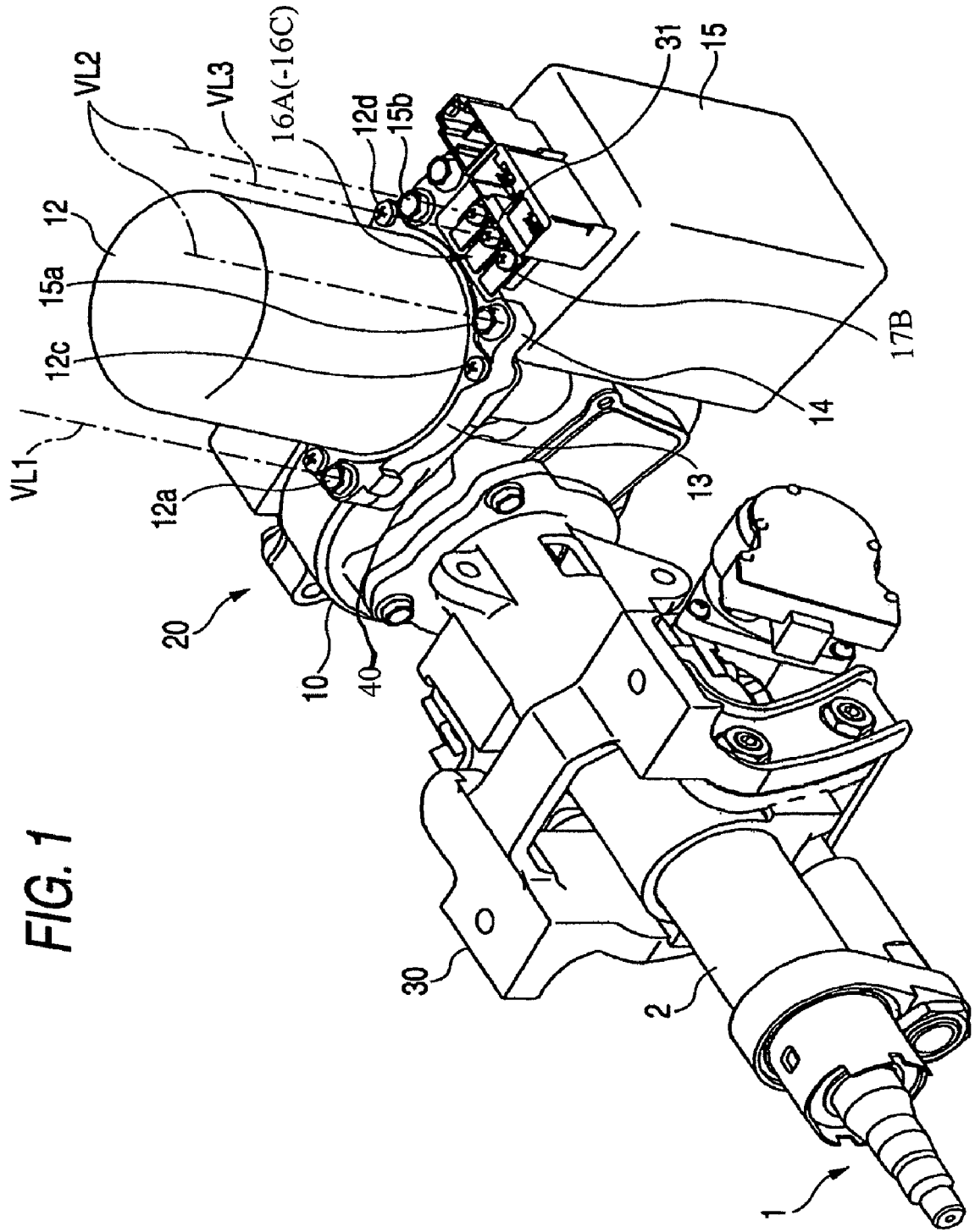
FIG. 1 is a view for explaining one embodiment of an electric power steering device according to the present invention.
Figure 2:
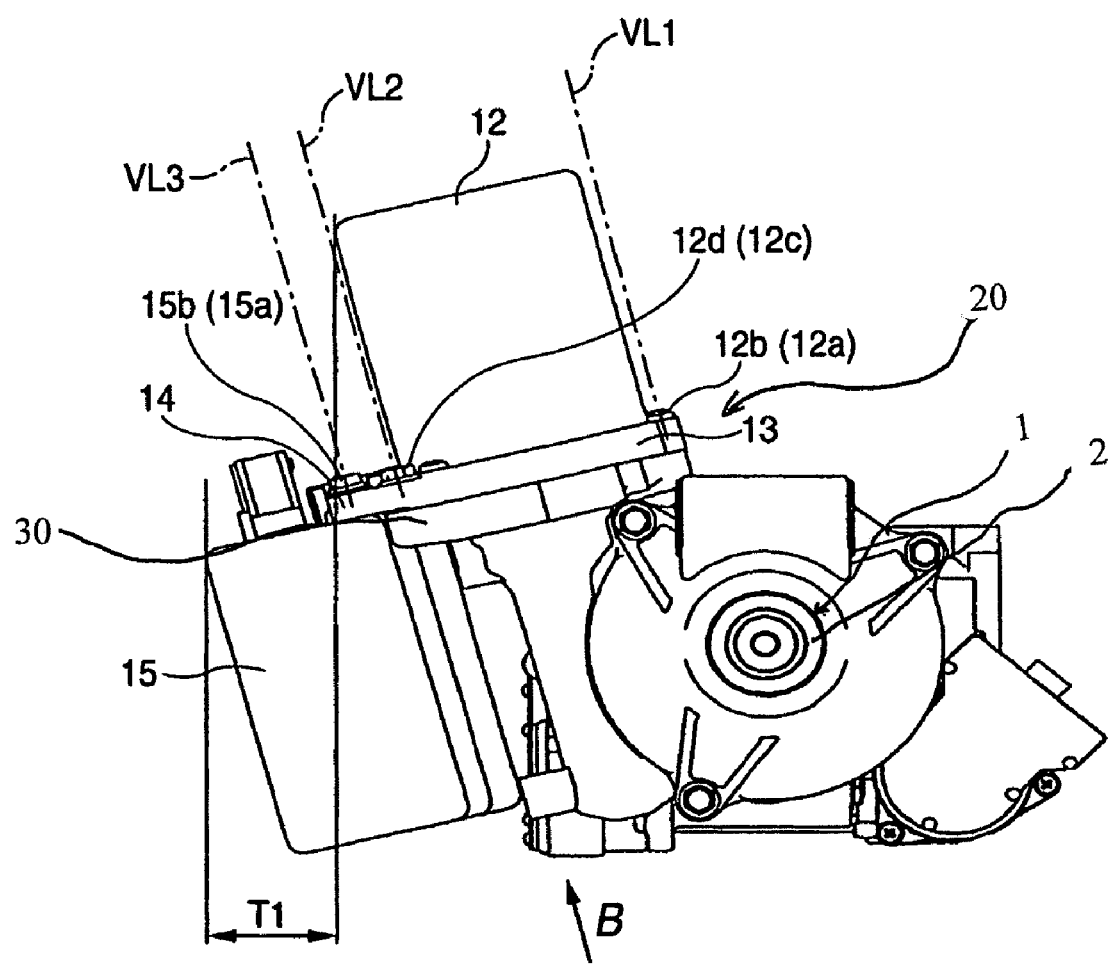
FIG. 2 is a view for explaining one embodiment of the electric power steering device according to the present invention.

Now, an embodiment of the present invention will be described below by suitably referring to the drawings. FIGS. 1 and 2 are views for explaining one embodiment of an electric power steering device according to the present invention. FIG. 1 is a perspective view showing a state that the electric power steering device is looked down from a steering shaft side. FIG. 2 is a diagram viewed from a front in a lower shaft side.

As shown in FIGS. 1 and 2, the electric power steering device indicates an example of a column assist type in which a motor 12 for applying a steering assist force to a steering system and a controller 15 for controlling a turning on state of the motor 12 are provided and the motor 12 and the controller 15 are attached to a steering column 20 as an attaching member 31 of a steering mechanism. In this example, the steering column 20 equipped with the electric power steering device further includes a bracket 30 or the like for attaching the electric power steering device to a side member of a vehicle. However, since these members are the same as those of a known structure, an explanation thereof will be properly omitted.

The steering column 20 includes a housing 10 having an inner column 2 in a steering shaft 1 side and an outer column to which the inner column 2 can be internally fitted.

The inner column 2 supports the steering shaft 1 so as to freely rotate. When a steering force from a driver is allowed to act on a steering wheel not shown in the drawing, the steering force is transmitted to the steering shaft 1. Then, the steering shaft 1 is connected to a steering torque sensor (not shown in the drawing) so that a steering torque transmitted to the steering shaft can be outputted as a steering torque detected value. The steering torque detected value outputted from the steering torque sensor is inputted to the controller 15.

To the controller 15, an electric power can be supplied from, for instance, a battery through an ignition switch. To the controller 15, necessary signals such as a vehicle speed detected value detected by, for instance, a vehicle speed sensor are inputted as well as the steering torque detected value. Thus, the controller can control the turning on state of the motor 12 so that the motor generates an assist torque corresponding to the steering torque of the steering system on the basis of the necessary signals.

The housing 10 is formed with a casting made of an aluminum alloy. An output shaft (not illustrated) is extended from a surface of the housing 10 opposite to the steering shaft 1. In the housing 10, a steering assist mechanism (not shown in the drawing) including a reduction gear that can transmit a steering assist force by the motor 12 to the output shaft is provided. The steering force to which the assist torque corresponding to the steering torque of the steering system is applied is transmitted to a lower shaft from the output shaft not shown in the drawing through a universal joint connected thereto. Then, a rolling and steering wheel can be rolled and steered through a steering force transmitting mechanism by the transmitted steering force.

The motor 12 has a flange part 13 in the periphery of a side attached to the attaching member of the steering mechanism. The flange part 13 is formed in a position at the boundary between the main body part of the motor 12 and the output shaft of the motor 12. In the direction of a circumference of the flange part 13, four attaching holes (not shown in the drawing) are formed at substantially equal intervals. Then, fixing bolts 12a to 12d as detachable mechanical fixing units are respectively inserted into the attaching holes and can be fastened to tapped holes (not shown in the drawing) formed on the upper part of the housing 10 of the steering column 20. In other words, the fixing bolts 12a to 12d can fix relative to the motor 12 two positions respectively located in the steering shaft 1 side and the lower shaft side in the direction along the axis of the steering column 20 that are opposed to each other with the motor 12 sandwiched in between them. Thus, the motor 12 is directly attached to the upper part of the housing 10 as the attaching member 31 of the steering mechanism. Here, as shown in FIG. 2, the end of the output shaft not shown in the drawing is attached at a position oblique relative to the axis side of the steering column 20, so that the motor 12 is entirely inclined (in an example shown in FIG. 2, the main body of the motor is inclined counterclockwise, that is, leftward).

Further, the flange part 13 further includes a flange extension part 14 formed so as to be extended from a part of the flange part in the radial direction (in the example shown in FIG. 2, the protruding part protrudes leftward). (In this embodiment, the flange extension part 14 is extended in a radially outward.) Then, the controller 15 is attached to the flange extension part 14 in the output shaft side (the side shown by a sign B in FIG. 2) of the motor 12. That is, as shown in FIG. 2, when the controller 15 is viewed from a direction along the axis of the steering column 20, the controller 15 is arranged at a position of, what is called a point symmetry with respect to a connecting terminal part to the motor 12 as a basic point. The controller 15 is fixed to the flange extension part 14 by two fixing bolts 15a and 15b at both sides in the direction along the axis of the steering column 20 from the same sides of the fixing bolts 12a to 12sd of the motor 12.

Here, in the motor 12 and the controller 15, the attaching and detaching directions of the fixing bolts 15a and 15b of the controller 15 are the same as the attaching and detaching directions of the fixing bolts 12a to 12d of the motor 12. Namely, as shown in FIGS. 1 and 2, assuming that each of the axes of the attaching and detaching directions of the fixing bolts 12a to 12d of the motor 12 is set to VL1 and each of the axes of the attaching and detaching directions of the fixing bolts 15a and 15b is set to VL2, when the axis VL1 is directed to a vertical direction, other axes VL2 are all directed to vertical directions.

Figure 3:
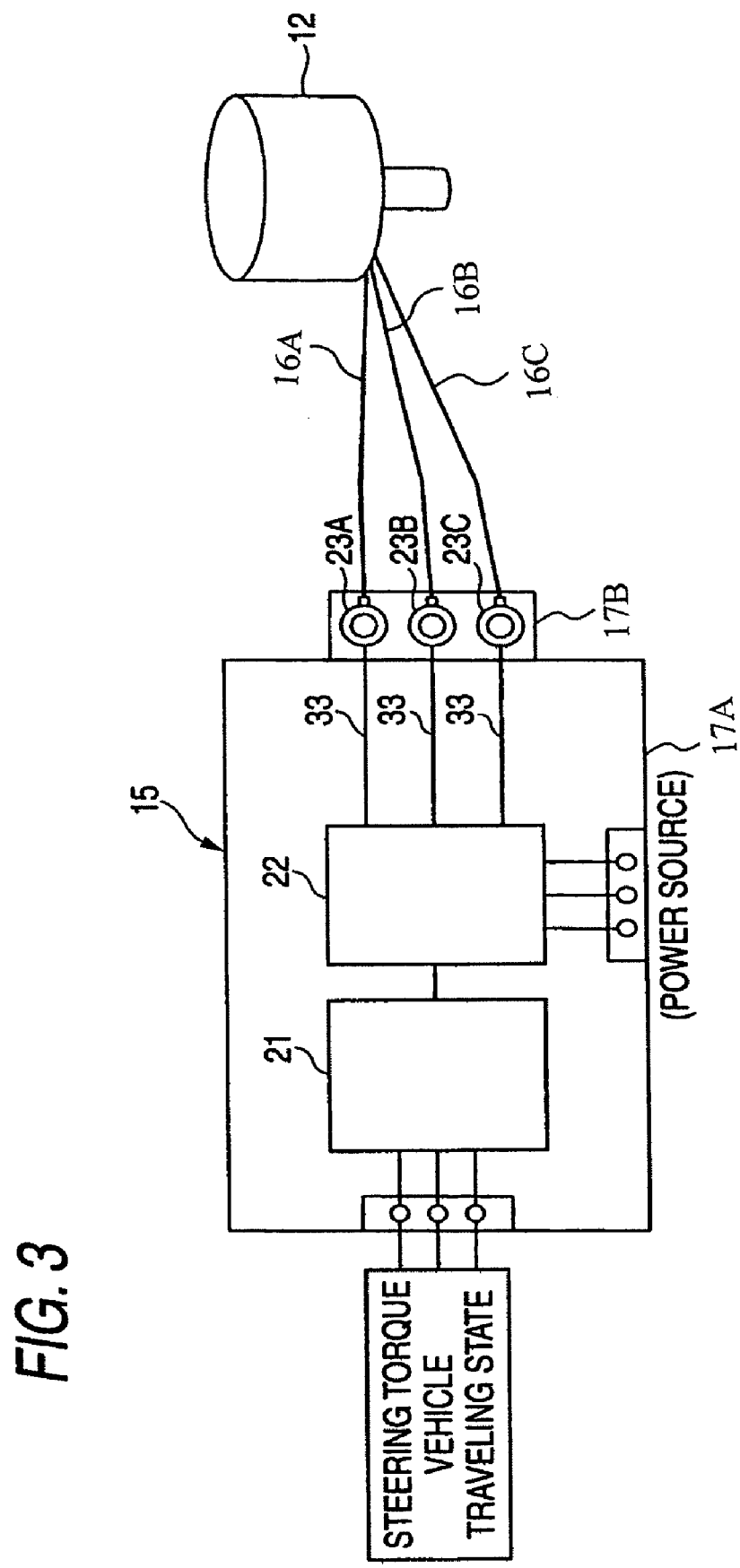
FIG. 3 is a diagram showing a schematic structure for explaining detachable electric connecting units for connecting a motor and a controller to each other.
Figure 5:
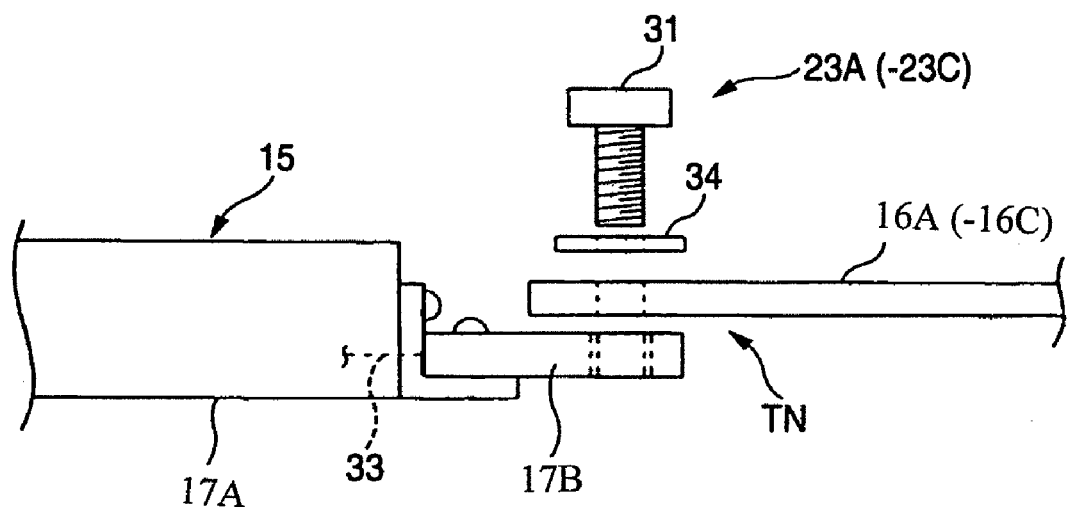
FIG. 5 is a view showing a side surface of the connecting part between the terminal base and the bus bar (a diagram viewed from a direction of A in FIG. 4)

Further, in the electric power steering device, as shown in FIGS. 3 and 5, the motor 12 and the controller 15 are connected to each other by detachable electric connecting units. Now, parts connected to each other by the detachable electric connecting units will be described below.

The motor 12 and the controller 15 are connected to each other by bus bars 16A, 16B and 16C. Each of the bus bars 16A to 16C is connected to a terminal base 17B of the controller 15 by a bolt 31 as the detachable electric connecting unit.

Specifically, the controller 15 includes a board 17A as shown in FIG. 3. On the board 17A, a control circuit 21 and a driving circuit 22 are mounted. To the control circuit 21, various kinds of information about the steering torque and the travelling state of a vehicle is supplied from various sensors not shown in the drawing. The control circuit 21 activates a previously stored prescribed program to process input information on the basis of an algorithm for a steering force assist provided by the program and transmits the processed result to the driving circuit 22 at each prescribed timing. Then, the processed result is obtained as, for instance, a duty ratio for switching a power supplied to the driving circuit 22. Thus, the driving circuit 22 can generate a driving power for driving the motor 12 in accordance with the control of the control circuit 21.

Figure 4:
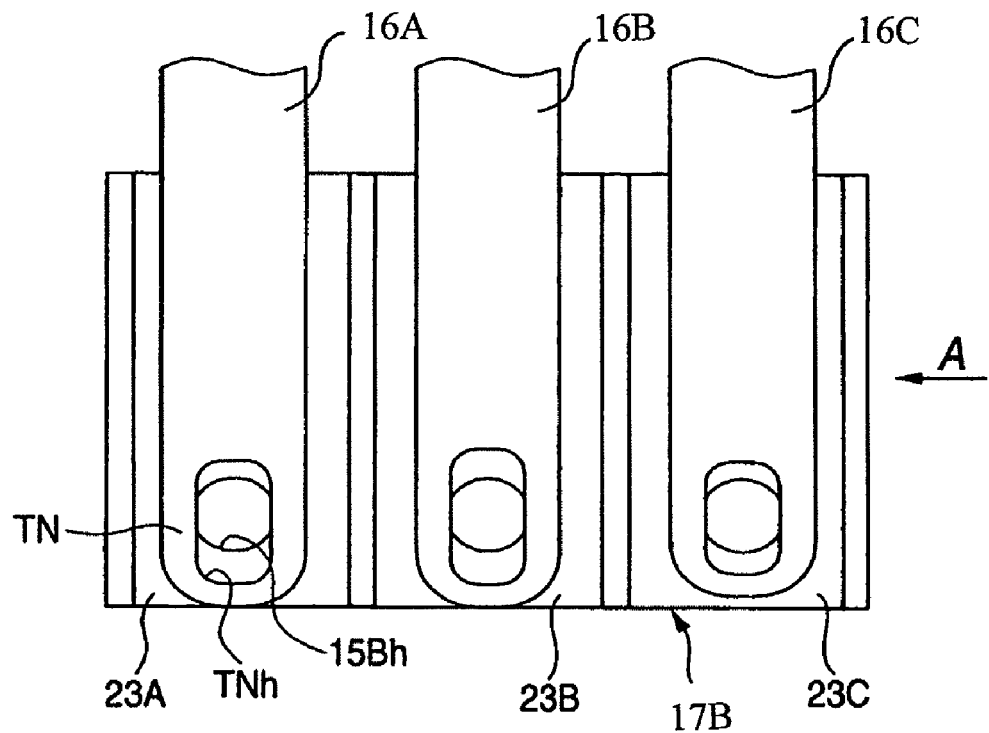
FIG. 4 is an enlarged view of a connecting part of a terminal base and bus bars.

Here, in one end part of the board 17A in the motor 12 side, the terminal base 17B is provided that functions as a connecting part to the motor 12 as shown in an enlarged view in FIG. 4. On the terminal base 17B, three output terminals 23A to 23C respectively having tapped holes 15Bh to which bolts can be fastened are formed in parallel. The output terminal 23A to 23C can be respectively externally fastened by using bolts 31 as shown in FIG. 5. Further, to the output terminals 23A to 23C respectively, wiring 33 for supplying a power from the driving circuit 22 is connected (see FIG. 3). On the other hand, on the faces of the terminals of the output terminals 23A to 23C respectively in a fastening side, terminals TN of the three bus bars 16A to 16C as power lines extending from the motor 12 are respectively extended to corresponding positions. In the end parts of the bus bars 16A to 16C, respectively, as shown in FIG. 4, connecting slots TNh are formed. Thus, the bus bars 16A to 16C can be respectively fastened to the terminal base 17B by the bolts 31 through washers 34.

Here, the attaching and detaching directions of the bolts 31 are the same as the attaching and detaching directions of the fixing bolts 15a and 15b as the fixing units of the controller 15. That is, as shown in FIGS. 1 and 2, assuming that the axis of the attaching and detaching direction of each of the fixing bolts 15a and 15b of the controller 15 is set to VL2 and the axis of the attaching and detaching direction of the bolt 31 is set to VL3, when the axis is directed to a vertical direction, other axis VL3 is also directed to a vertical direction. Here, the electric connecting unit corresponds to the bolt 31.

Now, an operation and effects of the electric power steering device will be described below.

According to the electric power steering device, the motor 12 has the flange part 13 attached to the attaching part of the steering mechanism. The flange part 13 further includes the flange extension part 14 extended from a part of the flange part in the radial direction. Since the controller 15 is attached to the flange extension part 14 to be mounted on the output shaft side B of the motor 12, even when the motor 12 is laid out to be inclined relative to the vehicle, the controller 15 can be laid out so as to be located in a space as a dead space like a space in the side of a gear box (an area designated by a sign S shown in FIG. 6). Thus, the electric power steering device can be made to be compact.

Figure 6:
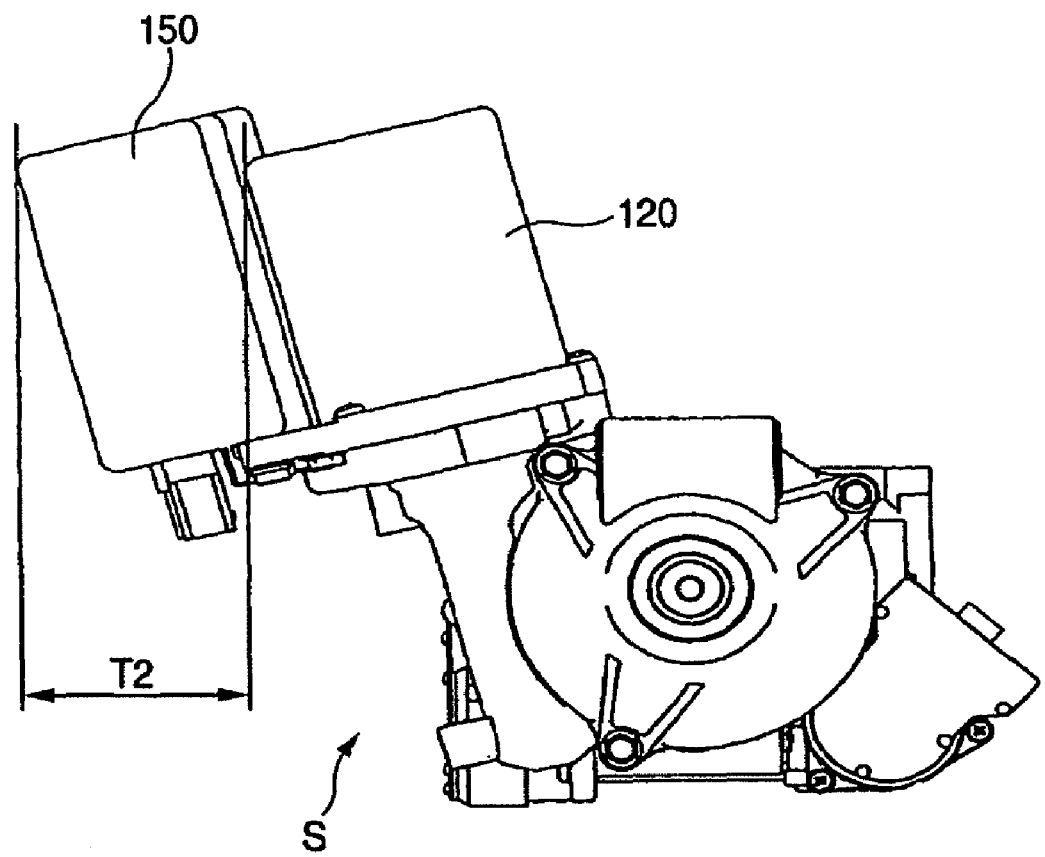
FIG. 6 is a view showing one example of a usual electric power steering device.

Especially, since the space S located in the side of the gear box can be effectively employed, as shown in FIG. 2, an amount of protrusion T1 of the controller 15 can be decreased more than an amount of protrusion T2 of a controller 150 shown in FIG. 6. Thus, a compact layout can be realized.

Further, according to the electric power steering device, since the attaching and detaching directions of the fixing bolts 15a and 15b are the same as the attaching and detaching directions of the fixing bolts 12a to 12d of the motor 12, both the motor 12 and the controller 15 can be attached and detached in the same direction from the upper part of the housing 10 of the steering column 20. Accordingly, for instance, in an assembly step in a production line, the motor and the controller can be easily assembled in the same step.

Further, since the motor and the controller are easily temporarily held in the assembly step, a working efficiency can be improved and an assembly time can be shortened. Therefore, the assembly or attaching characteristics of the electric power steering device itself to the steering mechanism can be improved.

Further, when the controller 15 is attached or detached, the fixing bolts 15a and 15b of the controller 15 itself and the bolts 31 as the electric connecting units can be attached and detached from the same direction, the attaching characteristics of the controller 15 can be improved.

Further, the motor 12 employs the housing 10 of the steering column 20 as the attaching member 31 of the steering mechanism and the flange part 13 is directly attached to the upper part of the housing 10. Since the controller 15 is attached to the flange part 13, the generated heat of the controller 15 can be preferably radiated to the steering column 20 as a member high in its heat capacity through the flange part 13. Accordingly, heat radiation characteristics of the controller 15 can be improved.

Further, according to the electric power steering device, the motor 12 and the controller 15 are connected to each other by the detachable busbars 16A to 16C, the busbars can be shortened and the generation of radio noise can be suppressed.

The electric power steering device and the attachment structure for the motor and the controller for the electric power steering device according to the present invention are not limited to the above-described embodiment and various modifications may be made without departing the gist of the present invention.

For instance, in the above-described embodiment, the column assist type is mentioned as an example and the motor 12 and the controller 15 are directly attached to the steering column 20 as the attaching member 31 of the steering mechanism in the example. However, the present invention is not limited thereto and the electric power steering device may be applied to, for instance, a pinion assist type or a rack assist type. That is, when the motor and the controller are attached to the steering mechanism, in the case of the pinion assist type used as the attaching member 31 thereof, the motor and the controller may be arranged on a pinion shaft of a steering gear, and in the case of the rack assist type, they may be arranged on a rack shaft.

Further, as the attaching member 31 of the motor, if the electric power steering device according to the present invention can be formed, a suitable member of the steering mechanism may be used as the attaching member 31 thereof. However, when the generated heat of the controller 15 is preferably radiated to the member high in its heat capacity, the steering column is desirably used, in the case of the column assist type, as the attaching member 31 of the motor as described above and the flange part is preferably directly attached to the steering column.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. An electric power steering device comprising:
   a steering system comprising an attaching member;
   a motor that applies a steering assist force to the steering system in accordance with a steering torque of the steering system and comprises:

a flange part that is to be attached to the attaching member and comprises a flange extension part extended from a part of the flange portion in a radial direction;

a controller that controls a turning on state of the motor and provided separately from the motor;

wherein the controller is attached to the flange extension part so as to be mounted on an output shaft side of the motor, and wherein the motor and the controller are respectively attached by detachable fixing units and an attaching and detaching direction of the fixing unit of the controller is the same as the attaching and detaching direction of the fixing unit of the motor.

2. An electric power steering device comprising:

a steering system comprising an attaching member;

a motor that applies a steering assist force to the steering system in accordance with a steering torque of the steering system and comprises:

a flange part that is to be attached to the attaching member and comprises a flange extension part extended from a part of the flange portion in a radial direction;

a controller that controls a turning on state of the motor and provided separately from the motor;

wherein the controller is attached to the flange extension part so as to be mounted on an output shaft side of the motor; and wherein the motor and the controller are connected to each other by a detachable electric connecting unit, and the attaching and detaching direction of the electric connecting unit is made to be the same as the attaching and detaching direction of the fixing unit of the controller.

* * * * *